US012124876B2

(12) United States Patent
Dice et al.

(10) Patent No.: US 12,124,876 B2
(45) Date of Patent: Oct. 22, 2024

(54) SYSTEM AND METHOD FOR ACQUIRING AND RELEASING A LOCK USING COMPACT AND SCALABLE MUTUAL EXCLUSION

(71) Applicant: Oracle International Corporation, Redwood City, CA (US)

(72) Inventors: David Dice, Foxboro, MA (US); Alex Kogan, Needham, MA (US)

(73) Assignee: Oracle International Corporation, Redwood City, CA (US)

( * ) Notice: Subject to any disclaimer, the term of this patent is extended or adjusted under 35 U.S.C. 154(b) by 471 days.

(21) Appl. No.: 17/169,246

(22) Filed: Feb. 5, 2021

(65) Prior Publication Data
US 2022/0253339 A1    Aug. 11, 2022

(51) Int. Cl.
*G06F 9/50* (2006.01)
*G06F 9/30* (2018.01)

(52) U.S. Cl.
CPC ........ *G06F 9/5027* (2013.01); *G06F 9/30145* (2013.01)

(58) Field of Classification Search
CPC ............................ G06F 9/5027; G06F 9/30145
See application file for complete search history.

(56) References Cited

U.S. PATENT DOCUMENTS

| 6,965,961 | B1 * | 11/2005 | Scott | G06F 9/52 |
| | | | | 710/39 |
| 8,694,706 | B2 * | 4/2014 | Dice | G06F 9/526 |
| | | | | 710/200 |
| 9,727,369 | B2 * | 8/2017 | Dice | G06F 9/5027 |
| 2003/0200457 | A1 * | 10/2003 | Auslander | G06F 9/52 |
| | | | | 726/30 |
| 2004/0054861 | A1 * | 3/2004 | Harres | G06F 9/524 |
| | | | | 711/163 |
| 2007/0067774 | A1 * | 3/2007 | Kukanov | G06F 9/526 |
| | | | | 718/102 |
| 2010/0275209 | A1 * | 10/2010 | Detlefs | G06F 9/526 |
| | | | | 710/200 |
| 2014/0258645 | A1 * | 9/2014 | Dice | G06F 9/528 |
| | | | | 711/152 |

(Continued)

OTHER PUBLICATIONS

Dice, Dave, and Alex Kogan. "Hemlock: Compact and scalable mutual exclusion." Proceedings of the 33rd ACM Symposium on Parallelism in Algorithms and Architectures, pp. 173-183 (Year: 2021).*

(Continued)

*Primary Examiner* — Meng Ai T An
*Assistant Examiner* — Willy W Huaracha
(74) *Attorney, Agent, or Firm* — S. Scott Foster; Kowert, Hood, Munyon, Rankin & Goetzel, P.C.

(57) ABSTRACT

Compact and scalable mutual exclusion techniques are implemented for multiple executing threads. A thread may acquire a lock by swapping a pointer to the thread into a tail field of a lock data structure. If the swap operation returned a null value, then the lock is acquired. If the swap operation does not return a null value, then the thread may wait to obtain the lock from a predecessor thread. The thread may wait until a grant field in a data structure for the predecessor thread stores a pointer to the lock, signaling to the thread that the thread may acquire the lock.

20 Claims, 9 Drawing Sheets

(56) References Cited

U.S. PATENT DOCUMENTS

2018/0246773 A1\* 8/2018 Kimura .................. G06F 9/526
2021/0191788 A1\* 6/2021 Dice .................. G06F 9/30101

OTHER PUBLICATIONS

Mellor-Crummey, John M., and Michael L. Scott. "Algorithms for scalable synchronization on shared-memory multiprocessors." ACM Transactions on Computer Systems (TOCS) 9.1; pp. 21-65. (Year: 1991).\*

\* cited by examiner

SYSTEM AND METHOD FOR ACQUIRING AND RELEASING A LOCK USING COMPACT AND SCALABLE MUTUAL EXCLUSION

BACKGROUND

Field of the Disclosure

This disclosure relates generally to computer software, and more particularly to systems and methods for concurrency control between threads in a multi-threaded system.

Description of the Related Art

Modern computer systems may run applications that include multiple threads that execute simultaneously. Locking techniques may be implemented to synchronize access to a resource, such as data, that may be shared between the threads in order to perform various operations. In this way, locking techniques may enforce a mutual exclusion concurrency control policy to prevent errors that would otherwise arise from different threads accessing the shared resource simultaneously.

SUMMARY

Various techniques for compact and scalable mutual exclusion are described. A lock may be acquired and released by different threads utilizing a tail field in a lock data structure and respective grant fields for the different threads. To acquire a lock, a thread may swap a pointer to the thread into the tail field in the lock data structure. The value returned from the tail field in the lock data structure may indicate whether or not the lock is acquired. If the value returned from the tail field is null, then the lock may be considered acquired by the thread and the thread may enter a critical section. If the value returned from the tail field is not null, then that value may be a pointer to another thread that has acquired the lock or is waiting to acquire the lock. When the thread determines that the grant field for the other thread stores a pointer to the lock, the thread may be able to acquire the lock.

Figure 1:
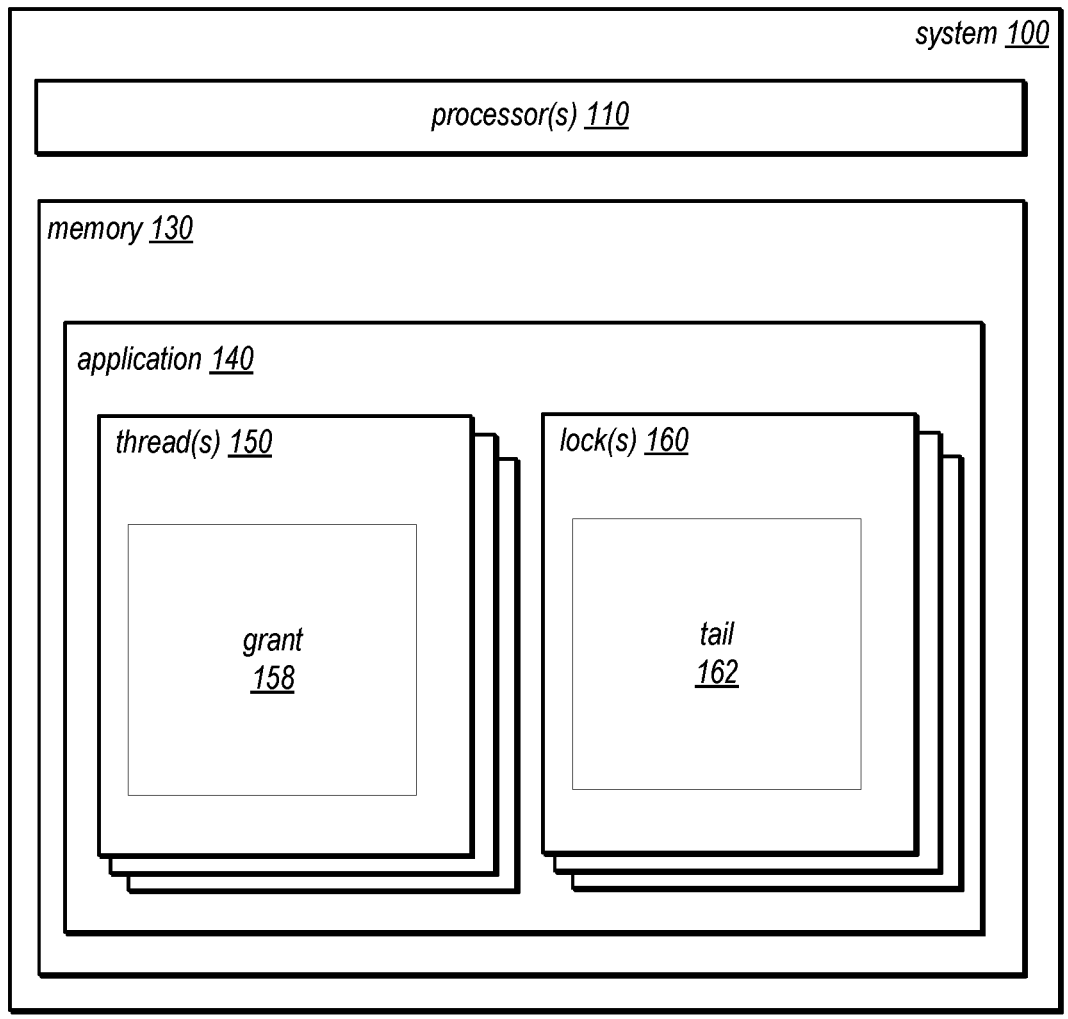
FIG. 1 is a block diagram illustrating a system implementing compact and scalable mutual exclusion for multiple threads, according to various embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Various techniques for compact and scalable mutual exclusion are described herein. Different locking techniques that provide mutual exclusion, such as ticket locks, may use two words for each lock instance and no per-thread data. Such techniques may perform well in the absence of contention, exhibiting low latency because of short code paths. Under contention, however, performance may suffer because all threads contending for a given lock will busy-wait on a central location, increasing coherence costs. For contended operation, so-called queue based locks, such as Craig Landin Hagersten (CLH) locks and Mellor-Crummey Scott (MCS) locks provide relief via local spinning. For both CLH and MCS, arriving threads enqueue an element (sometimes called a "node") onto the tail of a queue and then busy-wait on a flag in either their own element (MCS) or the predecessor's element (CLH). In such techniques like MCS and CLH, at most one thread busy-waits on a given location at any one time, increasing the rate at which ownership can be transferred from thread to thread relative to techniques that use global spinning, such as ticket locks.

In various embodiments, compact and scalable mutual exclusion techniques may be very compact, using just one word per thread plus one word per lock, while still providing local spinning, high throughput under contention, and low latency in uncontended scenarios. In various embodiments, compact and scalable mutual exclusion techniques may be context-free, such that information does not have to be passed from a lock operation to a corresponding unlock operation, while still implementing a First-In-First-Out (FIFO) ordering.

In various embodiments, compact and scalable mutual exclusion techniques may provide a lock where threads wait on a field associated with the predecessor. In various embodiments, however, compact and scalable mutual exclusion techniques may avoid using queue nodes, freeing compact and scalable mutual exclusion techniques from lifecycle concerns—allocating, releasing, caching—associated with that queue node structure. The lock and unlock paths of compact and scalable mutual exclusion techniques may be straightforward. An uncontended lock operation may use an atomic SWAP (exchange) operation, and unlock may use a compare-and-swap (CAS), in some embodiments.

In various embodiments, compact and scalable mutual exclusion techniques may be compact, utilizing just one word per extant lock plus one word per thread, regardless of the number of locks held or waited upon. The lock may contain a pointer to the tail of the queue of threads waiting on that lock, or null if the lock is not held. The thread at the head of the queue may be the owner (or holder) of the lock. Instead of implementing an explicit linked list running from the head (owner) to the tail, compact and scalable mutual exclusion techniques may utilize an implicit queue that can destroy locks without recovering a queue element, in some embodiments.

Instead of using queue nodes, in various embodiments compact and scalable mutual exclusion techniques may provision each thread with a singular grant field where its successor thread can busy-wait. In various embodiments, the grant field—which acts as a mailbox between a thread and its predecessor on the queue—is normally null, indicating empty. During an unlock operation, a thread may store the address of the lock into its grant field and then wait for that field to return to null. The successor thread may observes that the lock address appears in its predecessor's grant field, which may indicates that ownership of the lock has transferred. The successor may then respond by clearing the grant field, acknowledging receipt of ownership and allowing the grant field of its predecessor to be reused in subsequent handover operations, and then finally enters the critical section.

Under simple contention, compact and scalable mutual exclusion techniques may provide local spinning. But if there is one thread T1 that holds multiple contended locks, the immediate successors for each of the queues may busy-wait on T1's grant field. As multiple threads (via multiple locks) can be busy-waiting on T1's grant field, T1 may write the address of the lock being released into its own grant field to disambiguate and allow the specific successor thread to determine that ownership has been conveyed. In various embodiments, compact and scalable mutual exclusion techniques may be context-free, as the information does not need to be passed from a lock operator to an unlock operator. For example, some locking techniques (e.g., MCS and CLH) convey the address of the owner (head) node from the lock operation to the unlock operation. The unlock operation needs that node to find the successor, and to re-claim nodes from the queue so that nodes may be recycled. Compact and scalable mutual exclusion techniques, however, may not require the head pointer in the unlock operation, providing a context free technique.

FIG. 1 is a block diagram illustrating a system implementing compact and scalable mutual exclusion for multiple threads, according to various embodiments. A system 100 may include one or more processors 110 capable of executing multiple parallel threads 150 of execution coupled to a memory 130 that includes an operating system kernel and an application 140. An exemplary system 100 is discussed in further detail below in FIG. 6.

As discussed above, and below with regard to FIGS. 2-5B, threads 150 may include a data structure that includes a grant field 158. The grant field 158 may, in various embodiments, be implemented as a single word. One or multiple lock(s) 160 may utilized in order to implement concurrency controls for accessing shared data in memory 130. Lock(s) 160 may include a lock data structure that has a tail field 162. The tail field may, in various embodiments, be implemented as a single word.

Thread(s) 150 may invoke, call, or otherwise execute lock and unlock operations to respectively acquire and release lock(s) 160. For example, the various techniques for locking and unlocking, as discussed below and with regard to FIGS. 2-5B, may be invoked by respective lock and unlock application programming interface (API) calls.

One example of respective lock and unlock operations may be described according to the following pseudo-code listing, Listing 1:

```
1   class Thread :
2     atomic<Lock *>Grant = null
3   class Lock :
4     atomic<Thread *> Tail = null
5   def Lock (Lock * L) :
6     assert Self→Grant = null
7     ## Enqueue self at tail of implicit queue
8     auto predecessor = swap (&L→Tail, Self)
9     if predecessor ≠ null :
10      ## Contention : must wait
11      while predecessor→Grant ≠ L : Pause
12      predecessor→Grant = null
13      assert L→Tail ≠ null
14  def Unlock (Lock * L) :
15    assert Self→Grant = null
16    auto v = cas (&L→Tail, Self, null)
17    assert v ≠ null
18    if v ≠ Self:
19      ## one or more successors exist -convey ownership to successor
20      Self→Grant = L
21      while Self→Grant ≠ null : Pause
```

In the example given above in Listing 1, "Self" may refer to a thread-local structure containing the thread's "Grant" field. Threads may arrive in the lock operator at line 8 and atomically swap their own address into the lock's "Tail" field, obtaining the previous tail value, constructing an implicit FIFO queue. If the Tail field was null, then the caller acquired the lock without contention and may immediately enter the critical section. Otherwise the thread waits for the lock's address to appear in the predecessor's Grant field, signaling succession, at which point the thread restores the predecessor's Grant field to null (empty) indicating the field can be reused for subsequent unlock operations by the predecessor. The thread has been granted ownership by its predecessor and may enter the critical section. Clearing the Grant field, above, may be the only circumstance in which one thread may store into another thread's Grant field. Threads in the queue hold the address of their immediate predecessor, obtained as the return value from the swap operation, but do not know the identity of their successor, if any, in some embodiments.

In the unlock operator, at line 16, threads may initially use an atomic compare-and-swap (CAS) operation to try to swing the lock's Tail field from the address of their own thread, Self, back to null, which represents "unlocked". If the CAS was successful then there were no waiting threads and the lock was released by the CAS. Otherwise successors exist and the thread then writes the address of the lock L into its own Grant, alerting the waiting successor and passing ownership. Finally, the thread waits for that successor to acknowledge the transfer and restore the Grant field back to empty, indicating the field be reused for future locking operations. Waiting for the mailbox to return to null happens outside the critical section, after the thread has conveyed ownership.

In various embodiments, compact and scalable mutual exclusion techniques may allow TryLock operations, using an atomic CAS instead of SWAP, and attempting to swing the lock's tail field from null to the address of the caller's grant field.

In Listing 1, line 29, threads in the unlock operator may wait for the successor to acknowledge receipt of ownership, indicating the unlocking threads's Grant mailbox is again available for communication in subsequent locking operations. While this phase of waiting occurs outside and after the transfer of ownership (and not within the effective critical section or on critical path) such waiting may still impede the progress and latency of the thread that invoked unlock. Specifically, tightly coupled back-and-forth synchronous communication may be implemented, where the thread executing unlock stores into its Grant field and then waits for a response from the successor, while the successor, running in the lock operator, waits for the transfer indication (line 11) and then responds to the unlocking thread and acknowledges by restoring Grant to null (line 12). The unlock operator may await a positive reply from the successor in order to safely reuse the Grant field for subsequent operations. That is, the example of compact and scalable mutual exclusion techniques given above in listing 1, an unlock operation may not start until the previous contended unlock has completed, and the successor has emptied the mailbox. In this example, wait loops in the contended unlock path may implemented where threads may need to wait for the arriving successor to become visible to the current owner. While the only additional burden imposed by the example given above that falls inside the critical path is the clearing of the predecessor's Grant field by the recipient (Line 12), which implemented as a single store, other variations of the above technique may be implemented. For example, to mitigate the performance concern described above, a technique could be implemented in some embodiments to defer and shift the waiting-for-response phase (Listing-1 line 6) to the prologue of subsequent lock and unlock operations, allowing more useful overlap and concurrency between the successor, which clears the Grant field, and the thread which performed the unlock operation. The thread that called unlock may enter its critical section earlier, before the successor clears Grant.

Another example of respective lock and unlock operations may be described according to the following pseudo-code listing, Listing 2:

```
1    class Thread :
2      atomic<Lock *> Grant = null
3    class Lock :
4      atomic<Thread *> Tail = null
5    def Lock (Lock * L) :
6      assert Self→Grant = null
7      auto predecessor = swap (&L→Tail, Self)
8      if predecessor ≠ null :
9        while cas(&pred→Grant, L, null) ≠ L : Pause
10   def Unlock (Lock * L) :
11     assert Self→Grant = null
12     Self→Grant = L
13     auto v = cas (&L→Tail, Self, null)
14     if v = Self :
15       Self→Grant = null
16       return
17     while FetchAdd(&Self→Grant, 0) ≠ null : Pause
```

In some embodiments, an Aggressive Hand-Over (AH) technique may be implemented, changing (as depicted in the pseudo-code of Listing 2) the cone in unlock to first store the lock's address into the Grant field (line 12) optimistically anticipating the existence of successors waiting on the log and then execute the atomic CAS to try to swing the Tail field back from Self to null, handling the uncontended case. If the CAS succeeded, there are no successors waiting on the lock, and allow the operation to reset Grant back to null and return, and otherwise wait for the successor to clear Grant. This reorganization accomplishes handover earlier in the unlock path and improves scalability by reducing the critical path for handover. For uncontended locking, where there are no waiting successors, the superfluous stores to set and clear Grant are harmless to latency as the thread is likely to have the underlying caches line in modified state in its local cache.

In unlock, after storing into the Grant field and transferring ownership, the successor may enter the critical section and even release the lock in the interval before the original owner reaches the CAS in unlock in scenarios where the AH technique is implemented. As such, it is possible that the CAS in unlock could fetch a Tail value of null, in some scenarios.

The synchronous back-and-forth communication pattern where a thread waits for ownership and then clears the Grant field (Listing-1 Lines 11-12) may be inefficient on platforms that use MESI or MESIF "single writer" cache coherence protocols. Specifically, in unlock when the owner stores the lock address into its Grant field (Line 20), it drives the cache line underlying Grant into M-state (modified) in its local cache. Subsequent polling by the successor (Line 11) will pull the line back into the successor's cache in S-state (shared). The successor will then observe the waited-for lock address and proceed to clear Grant (Line 12) forcing an upgrade from S to M state in the successor's cache and invaliding the line from the cache of the previous owner, adding a delay in the critical path.

In various embodiments, the upgrade coherence transaction can be avoided by polling with CAS (Listing-2 Line 9) instead of using simple loads, so, once the hand-over is accomplished and the successor observes the lock address, the line is already in M-state in the successor's local cache. Such a technique may be referred to as the Coherence Traffic Reduction (CTR) technique.

In various embodiments, the same performance can be achieved by using an atomic "fetch-and-add of 0" (e.g., implemented via LOCK:XADD on x86) on Grant as a read-with-intent-to-write primitive, and, after observing the waited-for lock address to appear in Grant, issuing a normal store to clear Grant. In this way, the load instruction may be replaced in the busy-wait loop with fetch-and-add of 0. Busy-waiting with an atomic read-modify-write operator, such as CAS, SWAP or fetch-and-add, may be considered a performance anti-pattern. But in various embodiments, with the 1-to-1 communication protocol used on the Grant field, busy-waiting via atomic operations provides a performance benefit. And also because of the simple communication pattern, back-off in the busy-waiting loop may not be useful, in some scenarios.

In various embodiments, CTR may be applied at Listing 2 Line 17 as the Grant field will be written by that same thread in subsequent unlock operations.

In some embodiments, other operations, such as MONITOR-MWAIT to wait for invalidation, instead of waiting for a value, may be implemented. MWAIT may confer additional benefits, as it avoids a classic busy-wait loop and thus avoids branch mispredictions in the critical path to exit the loop when ownership has transferred. In addition, depending on the implementation, MWAIT may be more "polite" with respect to yielding pipeline resources, potentially allowing other threads, including the lock owner, to execute faster by reducing competition for shared resources. In some embodiments, busy-wait may also be performed via hardware transactional memory, where invalidation will cause an abort, serving as a hint to the waiting thread. In addition, other techniques to hold the line in M-state may be implemented in some embodiments, such as issuing stores to a dummy variable that abuts the Grant field but which resides on the same cache line. The "prefetchw" prefetch-for-write advisory "hint" instruction may be implemented, for example, in some embodiments.

In various embodiments, implementing CTR may result in a reduction in number of load operations that "hit" on a line in M-state in another core's cache—requiring write invalidation and transfer back to the requester's cache—and also a reduction in total off-core traffic, while providing an improvement in throughput. Similar benefits from CTR can be shown with a simple program where a set of concurrent threads are configured in a ring, and circulate a single token. A thread waits for its mailbox to become non-zero, clears the mailbox, and deposits the token in its successor's mailbox. Using CAS, SWAP or Fetch-and-Add to busy-wait improves the circulation rate, in some embodiments.

Another example of respective lock and unlock operations may be described according to the following pseudo-code listing, Listing 3:

| 1  | class Thread : |
| 2  | atomic<Lock *> Grant = null |
| 3  | class Lock : |
| 4  | atomic<Thread *> Tail = null |
| 5  | def Lock (Lock * L) : |
| 6  | while Self→Grant ≠ L : Pause |
| 7  | auto pred = swap (&L→Tail, Self) |
| 8  | if pred ≠ null : |
| 9  | while pred→Grant ≠ L : Pause |
| 10 | pred→Grant = null |
| 11 | assert L→Tail ≠ null |
| 12 | def Unlock (Lock * L) : |
| 13 | auto v = cas (&L→Tail, Self, null) |
| 14 | assert v ≠ null |
| 15 | if v ≠ Self : |
| 16 | while Self→Grant ≠ null : Pause |
| 17 | Self→Grant = L |

In some embodiments, an overlap technique may be implemented, as illustrated above in Listing 3. For example, threads arriving in the lock operator at Listing-3 line 6 may wait to ensure their Grant mailbox field does not contain a residual address from a previous contended unlock operation on that same lock, in which case it must wait for that tardy successor to fetch and clear the Grant field. In practice, waiting on this condition is rare. (If thread T1 were to enqueue an element that contains a residual Grant value that happens to match that of the lock, then when a successor T2 enqueues after T1, it will incorrectly see that address in T1's grant field and then incorrectly enter the critical section, resulting in exclusion and safety failure and a corrupt chain. The check at line 6 prevents that error scenario).

In Listing-3 line 16, threads may wait for their own Grant field to become empty. Grant could be non-null because of previous unlock operations that wrote and address into the field, but the corresponding successor has not yet cleared the field back to null, in some scenarios, such that the Grant field is still occupied. Once Grant becomes empty, the thread then writes the address of the lock into Grant, alerting the successor and passing ownership. When ultimately destroying a thread, in some embodiments waiting may occur while the thread's Grant field transitions back to null before reclaiming the memory underlying Grant.

Figure 2:
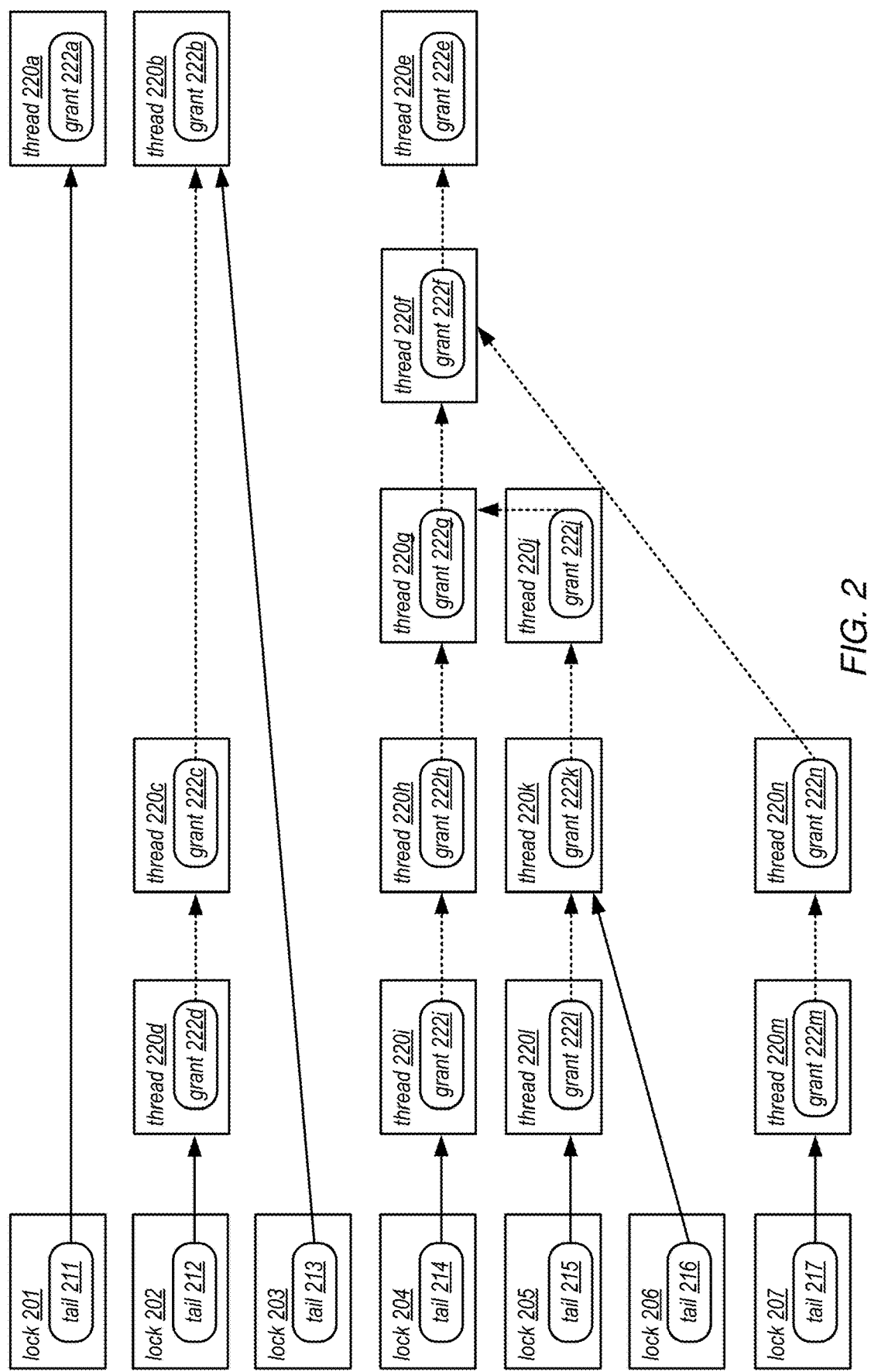
FIG. 2 is a logical block diagram illustrating example implied queues for locks utilizing tail and grant fields, according to some embodiments.

FIG. 2 is a logical block diagram illustrating example implied queues for locks utilizing tail and grant fields, according to some embodiments. Locks, such as locks 201, 202, 203, 204, 205, 206, and 207, may have respective tail fields, 211, 212, 213, 214, 215, 216, and 217, which are used as part of implementing various compact and scalable mutual exclusion techniques as discussed above and below with regard to FIGS. 3A-5B, for multiple threads, such as threads 220a, 220b, 220c, 220d, 220e, 220f, 220g, 220h, 220i, 220j, 220k, 220l, 220m, and 220n (with respective grant fields 222a, 222b, 222c, 222d, 222e, 222f, 222g, 222h, 222i, 222j, 222k, 222l, 222m, and 222n).

For example, solid arrows in FIG. 2 may represent a lock's explicit tail field with a pointer which points to the most recently arrived thread—the tail of the lock' queue. Dashed arrows, which appear between threads, refer to a thread's immediate predecessor in the implicit queue associated with a lock. The address of the immediate predecessor is obtained via the atomic swap executed when threads arrive. The dashed edge can be thought of as the waiting-on relation and may not be physical links in memory that could be traversed.

In the illustrated example, thread 220a holds lock 201 (e.g., with tail field 211 storing a pointer to thread 220a), thread 220b holds lock 202 and 203 while thread 220e holds locks 204, 205, and 207. Locks 220a, 220b, and 220e are executing in their respective critical sections, while all the other threads are stalled waiting for locks. The implicit queue of waiting threads for lock 202 is thread 220c (the immediate successor to thread 220b) followed by thread 220d. Thread 220d busy-waits on thread 220c's Grant field and thread 220c busy-waits on thread 220b's Grant field. Thread 220k holds lock 206, but also waits to acquire lock 205.

Threads 220h and 220j both busy-wait on thread 220g's Grant field. In some locking scenarios, compact and scalable mutual exclusion techniques provide local waiting, but when the dashed lines form junctions (e.g., elements with in-degree greater than one) in the waits-on directed graph, there may be non-local spinning. In the illustrated example, both threads 220n and 220g wait on thread 220f. While our design admits inter-lock performance interference, arising from multiple threads spinning on one Grant variable, as is the case for thread 220g and 220f, above, this case may be rare and not of consequence for common applications. (For comparison, CLH does not allow the concurrent sharing of queue elements, and thus provides local spinning, whereas in various embodiments compact and scalable mutual exclusion techniques as described herein have a shared singleton queue element—the Grant field—that can be subject to being busy-waited upon by multiple threads). In some scenarios, if there is a set of coordinating threads where each thread acquires only one lock at a time, then they will enjoy local spinning. Non-local spinning can occur only when threads hold multiple locks, in some embodiments.

When thread 220e ultimately unlocks lock 204, thread 220e stores a pointer to lock 204 into its Grant field. Thread 220f observes that store, assumes ownership, clears thread 220e's Grant field back to empty (null) and enters the critical section. When thread 220f then unlocks lock 204, it stores lock 204's address into its own Grant field. Threads 220g and 220n both monitor thread 220f's Grant field, with thread 220g waiting for lock 204 to appear and thread 220n waiting for lock 207 to appear. Both threads observe the update of thread 220f's Grant field, but thread 220n ignores the change while thread 220g notices the value now matches lock 204, the lock that thread 220g is waiting on, which indicates that thread 220f has passed ownership of lock 204 to thread 220g. Thread 220g clears thread 220f's Grant field, indicating that thread 220f can reuse that field for subsequent operations, and enters the critical section.

As noted earlier, compact and scalable mutual exclusion techniques, as described herein, may be compact. Table 1, illustrated below, illustrates the utilization of the various compact and scalable mutual exclusion techniques when compared to examples of other mutual exclusion techniques, MCS, CLH, and Ticket Locks.

TABLE 1

| | | Space | | |
|---|---|---|---|---|
| | Lock | Held | Wait | Thread | Init |
| MCS | 2 | E | E | 0 | |
| CLH | 2 + E | 0 | E | 0 | • |
| Ticket Locks | 2 | 0 | 0 | 0 | |
| Compact and Scalable Mutual Exclusion | 1 | 0 | 0 | 1 | |

In Table 1, the values in the Lock column reflect the size of the lock body. For MCS and CLH it may be assumed that the head of the chain is carried in the lock body, and thus the lock includes head and tail fields, using 2 words in total. E may represent the size of a queue element. CLH may use the lock to be pre-initialized with a so-called dummy element before use. When the lock is ultimately destroyed, the current dummy element may be recovered. The Held field indicates the space cost for each held lock and similarly, the Wait field indicates the cost in space of waiting for a lock.

The Thread field reflects per-thread state that may be reserved for locking. For compact and scalable mutual exclusion techniques, as described herein, this is the Grant field. A single word may be used. In some embodiments, to avoid false sharing the Grant field may be sequestered as the sole occupant of a cache line. Init indicates if the lock requires non-trivial constructors and destructors. CLH, for instance, may cause the current dummy node be released when a lock is destroyed. Taking MCS as an example, lock L is owned by thread T1 while threads T2 and T3 wait to acquire lock L. The lock body for L may use 2 words and the MCS chain consists of elements E1⇒E2⇒E3 where E1, E2 and E3 are associated with and enqueued by T1, T2, and T3 respectively. Lock L's head field points to T1, the owner, and the tail field points to T3. The space consumed in this configuration is 2 words for lock L itself plus 3*E for the queue elements.

As another example comparison, in MCS, when a thread acquires a lock, it contributes an element to the associated queue, and when that element reaches the head of the queue, the thread becomes the owner. In the subsequent unlock operation, the thread extracts and reclaims that same element from the queue. In CLH, a thread contributes an element but, and once it has acquired the lock, recovers a different element from the queue—elements migrate between locks and threads. Relatedly, in MCS, if the unlock operation is known to execute in the same stack frame as the lock operation, the queue element may be allocated on stack. This may not be the case for CLH.

Figure 3A:
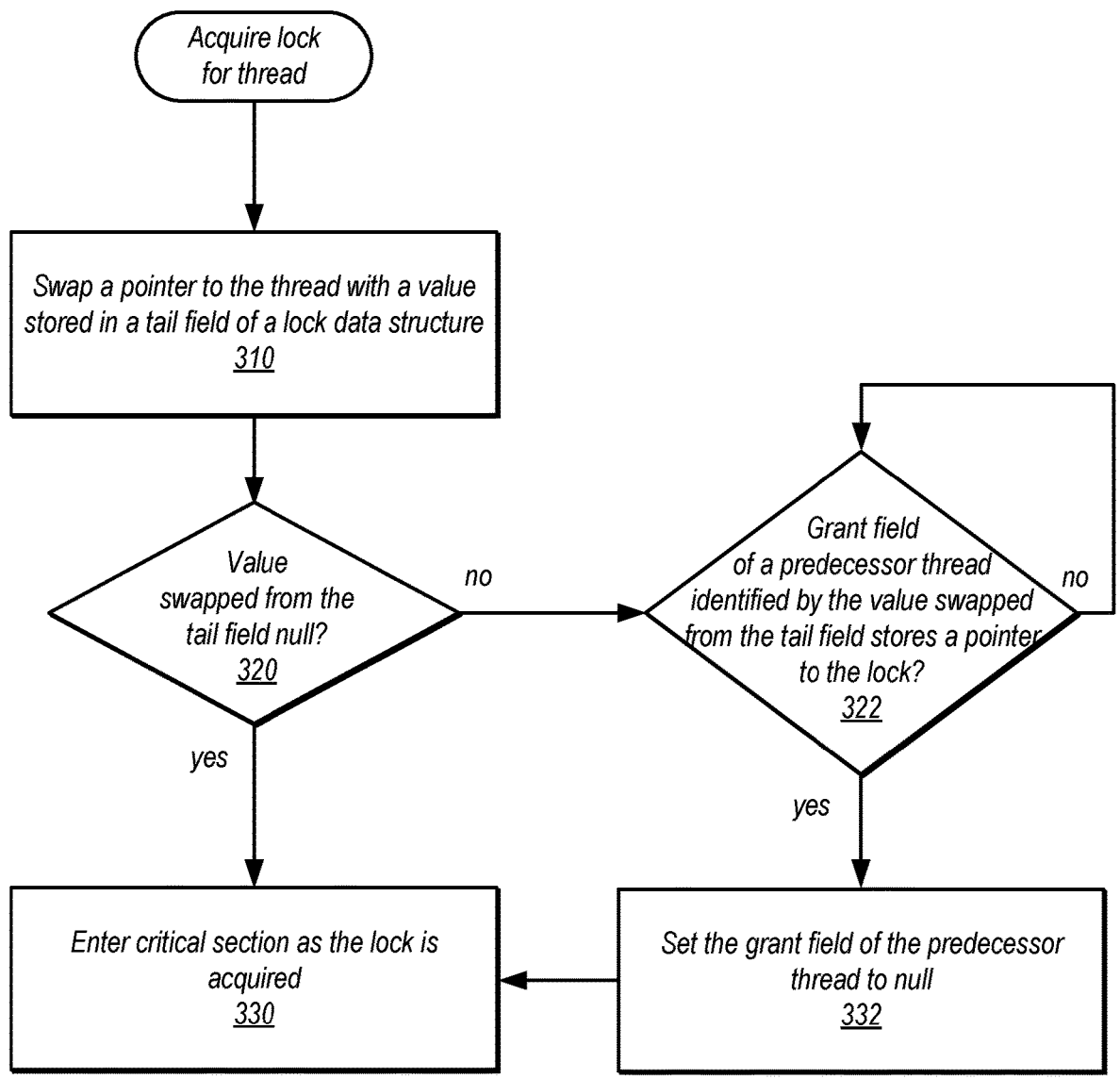
FIGS. 3A-3B are high-level flowcharts illustrating techniques for acquiring and releasing a lock using compact and scalable mutual exclusion, according to some embodiments.
Figure 3B:
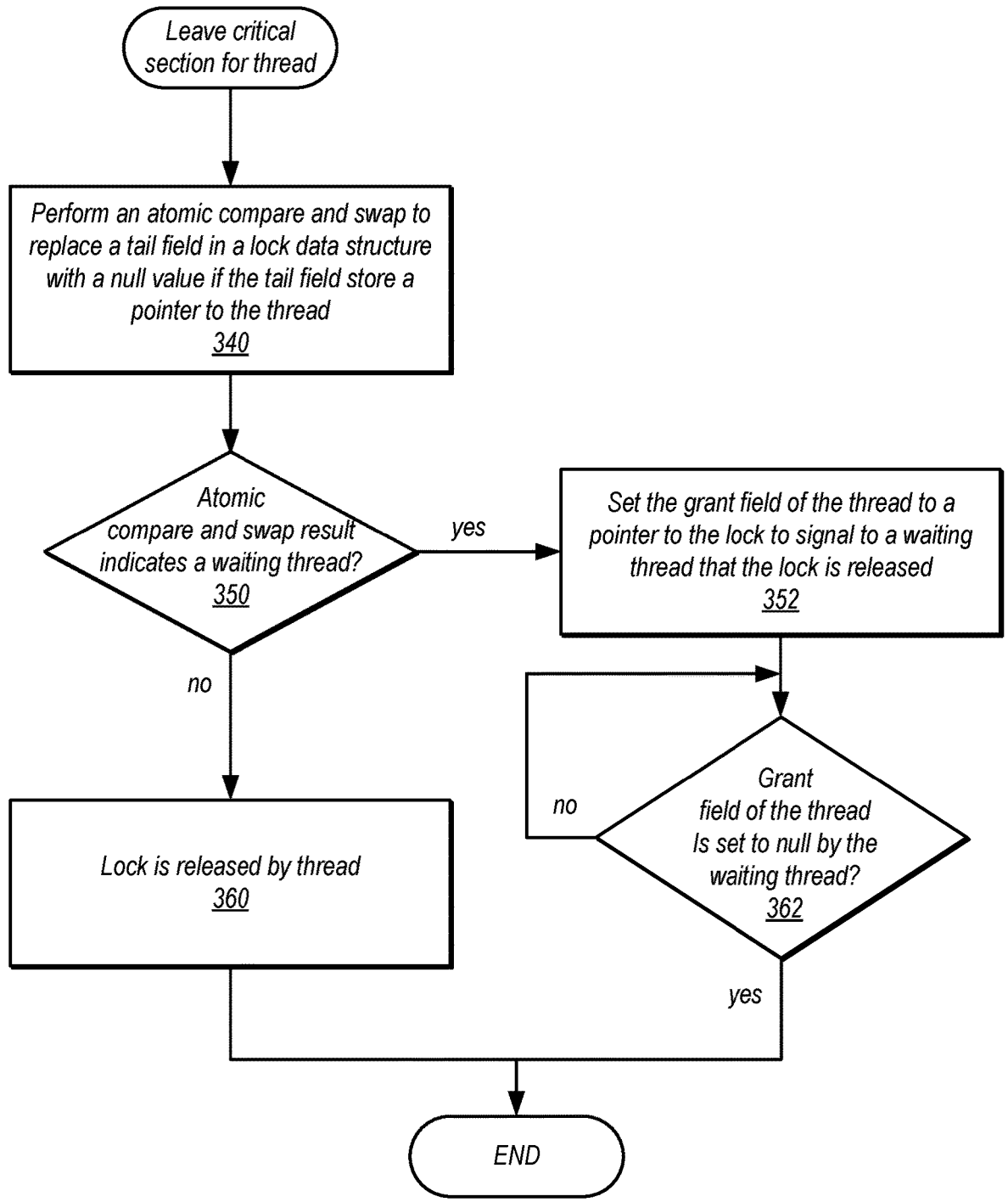

Compact and scalable mutual exclusion techniques, as discussed above may be implemented in various ways (e.g., as described in pseudo-code listings 1, 2, and 3 above). In various embodiments, various applications may implement Compact and scalable mutual exclusion techniques according to the various methods described below, including computer system 100 discussed above with regard to FIG. 1. FIGS. 3A-3B are high-level flowcharts illustrating techniques for acquiring and releasing a lock using compact and scalable mutual exclusion, according to some embodiments.

In FIG. 3A, a thread executing for an application (e.g., a sequence of instructions that can execute independently of and in parallel with other threads as part of an application), may invoke or call a lock operation to acquire a lock for the thread, in order to allow the thread to enter a critical section of the instructions executed by the thread which may, for example, access a shared resource such as shared data in memory. As indicated at 310, the thread may swap a pointer (e.g., address) to the thread with a value stored in a tail field of a lock data structure for the lock, in some embodiments. For example, various types of atomic instructions that are "swaps," emulate swaps, or otherwise cause swaps may be performed. The value returned from the swap may be evaluated as indicated at 320, in some embodiments. If the value swapped from the tail field is null, then as indicated by the positive exit from 320, the lock is acquired by the thread and the thread may enter the critical section, as indicated at 330.

If the value swapped is not null, then as indicated at 322 the thread may wait (as indicated by the self-loop from the negative exit from 322) until the grant field of a predecessor thread stores a pointer to the lock, in various embodiments. The predecessor thread may be identified by the value swapped from the tail field which may be a pointer to that predecessor thread, allowing the thread to access the grant field of the predecessor thread. As indicated by the positive exit from 322, when the grant field of the predecessor thread does store a pointer to the lock, then the thread may set the grant field of the predecessor thread to null, as indicated at 332, and enter the critical section as the lock is acquired, as indicated at 330.

In FIG. 3B, a thread may have completed instructions in the critical section and may be ready to release a lock. The thread may invoke or call an unlock operation to release the lock, in order to allow the lock to be obtained by another thread (e.g., a successor thread waiting for the lock or be available to be obtained by another thread when requested). As indicated at 340, an atomic compare and swap to replace a tail field in a lock data structure with a null value may be performed, in various embodiments. For example, various types of atomic instructions that are "compare and swaps," emulate compare and swaps, or otherwise cause compare and swaps may be performed. The atomic compare and swap operation may complete successfully if the tail field stores a pointer to the thread. As indicated at 350, the atomic compare and swap result may indicate whether a thread is waiting to obtain the lock, in some embodiments. If the compare and swap operation is successful, then no thread is waiting and as indicated by the negative exit from 350, the lock may be considered released by the thread, as indicated at 360.

If the atomic compare and swap result indicates a thread is waiting (e.g., an unsuccessful result), then as indicated by the positive exit from 350, the grant field of the thread may be set to a pointer to the lock to signal to a successor thread waiting for the lock that the lock is released to that successor thread, as indicated at 352. The thread may then wait to complete the unlock operation, as indicated by the negative exit loopback from 362, until the grant field of the thread is set to null by the waiting thread. Then, the unlock operation may be complete.

Figure 4A:
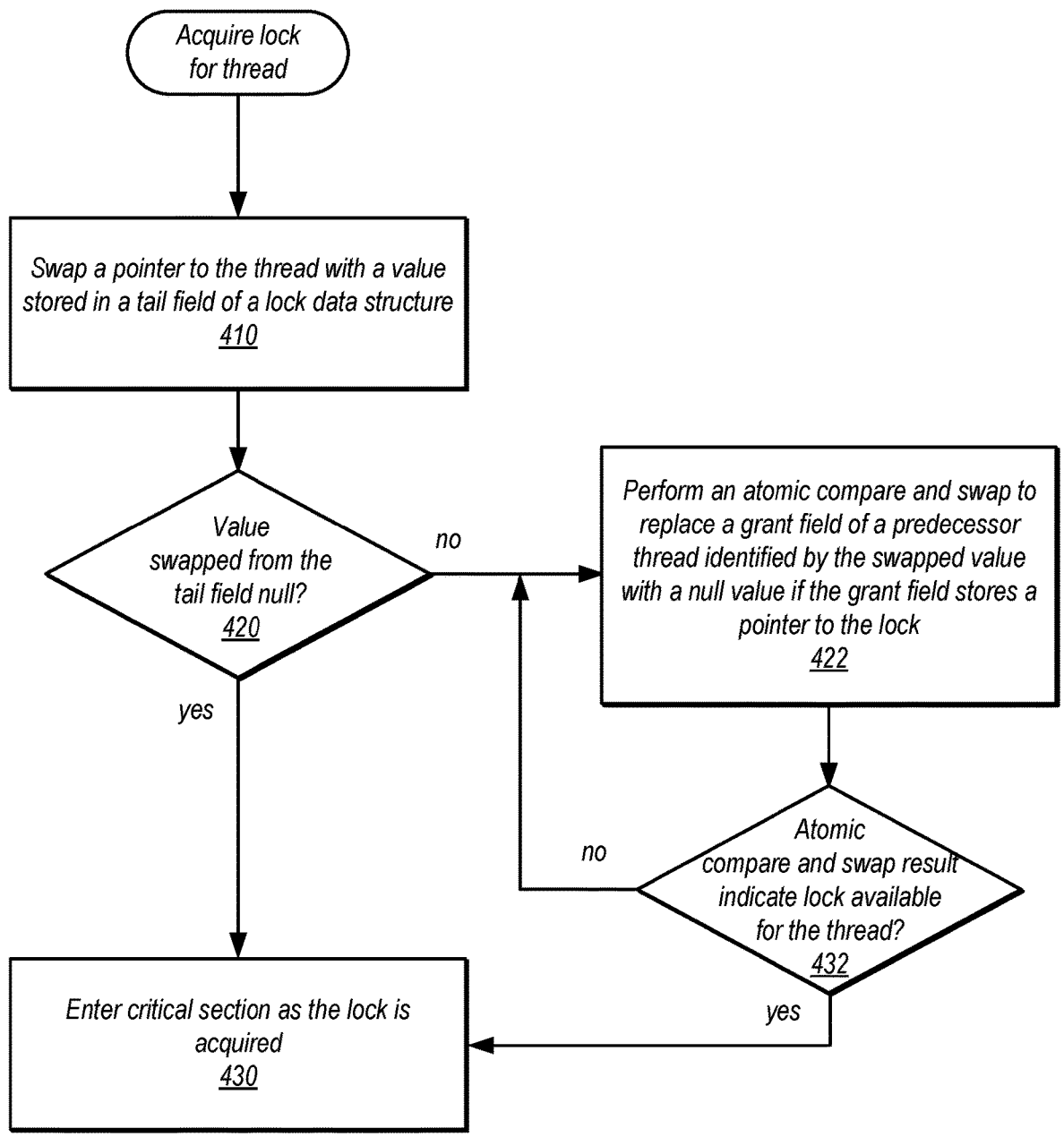
FIG. 4A-4B are high-level flowcharts illustrating techniques for acquiring and releasing a lock using compact and scalable mutual exclusion, according to some embodiments.

In FIG. 4A, a thread executing for an application (e.g., a sequence of instructions that can execute independently of and in parallel with other threads as part of an application), may invoke or call a lock operation to acquire a lock for the thread, in order to allow the thread to enter a critical section of the instructions executed by the thread which may, for example, access a shared resource such as shared data in memory. As indicated at 410, the thread may swap a pointer (e.g., address) to the thread with a value stored in a tail field of a lock data structure for the lock, in some embodiments. For example, various types of atomic instructions that are "swaps," emulate swaps, or otherwise cause swaps may be performed. The value returned from the swap may be evaluated as indicated at 420, in some embodiments. If the value swapped from the tail field is null, then as indicated by the positive exit from 420, the lock is acquired by the thread and the thread may enter the critical section, as indicated at 430.

If the value swapped is not null, then as indicated at 422, the thread may perform an atomic compare and swap to replace a grant field of a predecessor thread identified by the swapped value, with a null value, in some embodiments. The compare and swap may compare the current value of the grant field with a pointer to the lock. If the pointer to the lock is stored in the grant field, then the compare and swap may complete successfully, and if not, then the compare and swap will not complete successfully. As indicated by the loop back from the negative exit from 432, the atomic compare and swap of 422 may be performed until successful, which may indicate that the lock is available for the thread (as the predecessor will have stored the lock value in the grant field to hand over the lock). As indicated by the positive exit from 432, the thread may enter the critical section as the lock is acquired, as indicated at 430.

Figure 4B:
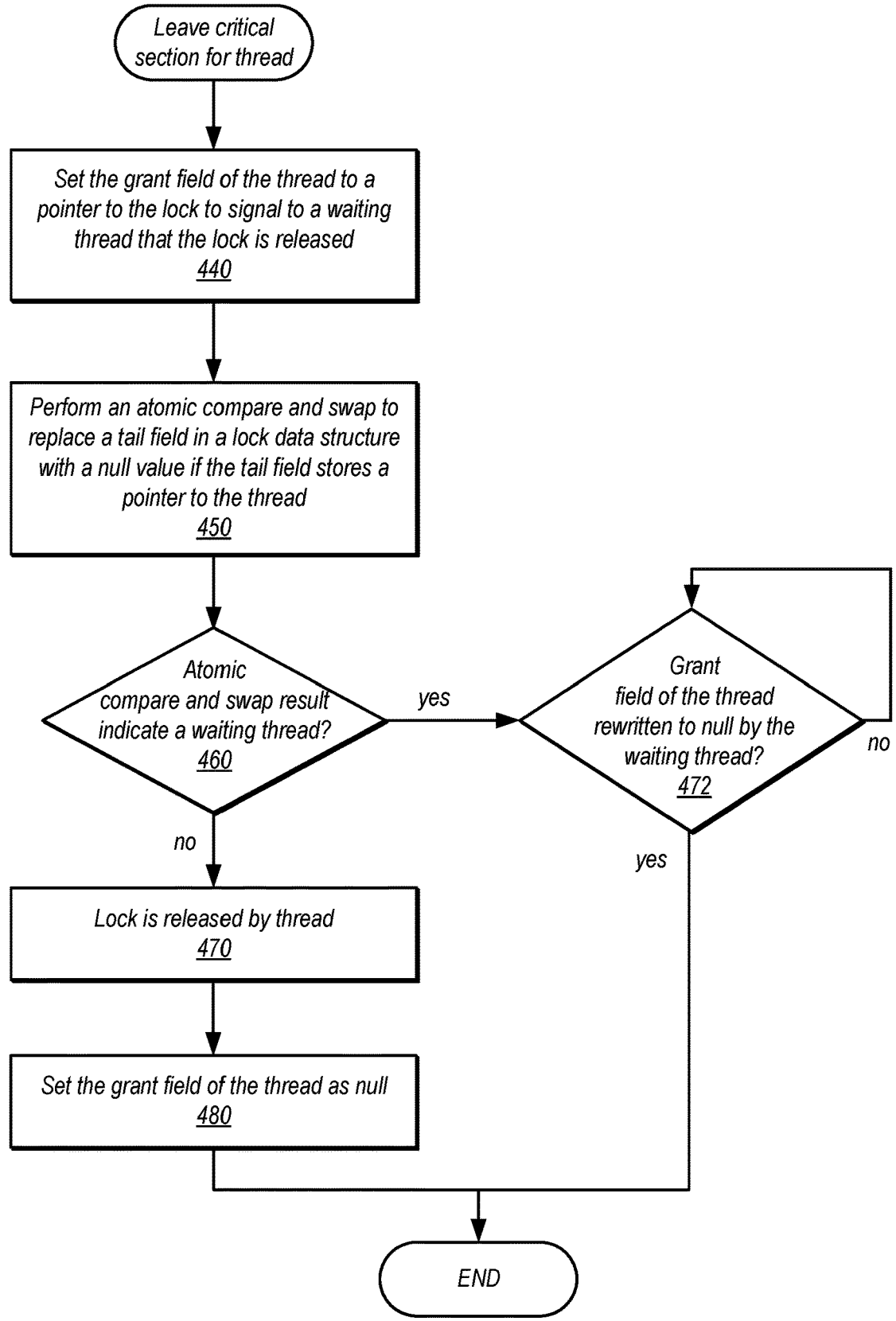

In FIG. 4B, a thread may have completed instructions in the critical section and may be ready to release a lock. The thread may invoke or call an unlock operation to release the lock, in order to allow the lock to be obtained by another thread (e.g., a successor thread waiting for the lock or be available to be obtained by another thread when requested). As indicated at 440, the grant field of the thread may be set to a pointer to the lock to signal to a waiting thread that the lock is released, in some embodiments. As indicated at 450, an atomic compare and swap to replace a tail field in a lock data structure with a null value may be performed, in various embodiments. For example, various types of atomic instructions that are "compare and swaps," emulate compare and swaps, or otherwise cause compare and swaps may be performed. The atomic compare and swap operation may complete successfully if the tail field stores a pointer to the thread. As indicated at 460, the atomic compare and swap result may indicate whether a thread is waiting to obtain the lock, in some embodiments. If the compare and swap operation is successful, then no thread is waiting and as indicated by the negative exit from 460, the lock may be considered released by the thread, as indicated at 470. As indicated at 480, the thread may set the grant field of the thread as null, in some embodiments.

If the atomic compare and swap result indicates a thread is waiting (e.g., an unsuccessful result), then as indicated by the positive exit from 460, the thread may wait to complete the unlock operation, as indicated by the negative exit loopback from 472, until the grant field of the thread is set to null by the waiting thread. Then, the unlock operation may be complete.

Figure 5A:
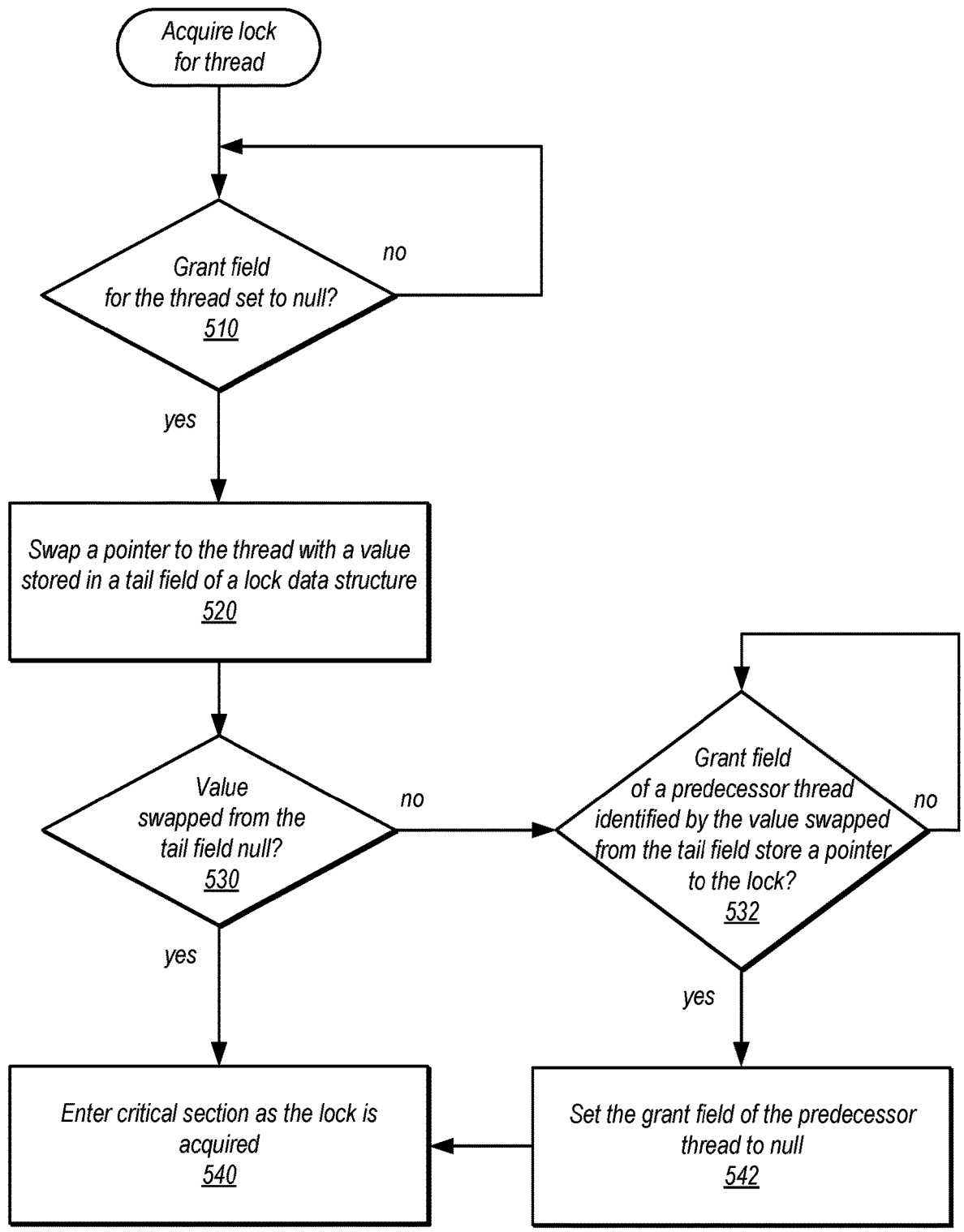
FIG. 5A-5B are high-level flowcharts illustrating techniques for acquiring and releasing a lock using compact and scalable mutual exclusion, according to some embodiments.

In FIG. 5A, a thread executing for an application (e.g., a sequence of instructions that can execute independently of and in parallel with other threads as part of an application), may invoke or call a lock operation to acquire a lock for the thread, in order to allow the thread to enter a critical section of the instructions executed by the thread which may, for example, access a shared resource such as shared data in memory. As indicated at 510, a thread may wait to attempt acquiring the lock until a grant field for the thread is set to null, as indicated by the negative exit loopback at 510. When the grant field for the thread is set to null, then, as indicated at 520, the thread may swap a pointer (e.g., address) to the thread with a value stored in a tail field of a lock data structure for the lock, in some embodiments. For example, various types of atomic instructions that are "swaps," emulate swaps, or otherwise cause swaps may be performed. The value returned from the swap may be evaluated as indicated at 530, in some embodiments. If the value swapped from the tail field is null, then as indicated by the positive exit from 530, the lock is acquired by the thread and the thread may enter the critical section, as indicated at 540.

If the value swapped is not null, then as indicated at 532 the thread may wait (as indicated by the self-loop from the negative exit from 532 until the grant field of a predecessor thread stores a pointer to the lock, in various embodiments. The predecessor thread may be identified by the value swapped from the tail field which may be a pointer to that predecessor thread, allowing the thread to access the grant field of the predecessor thread. As indicated by the positive exit from 532, when the grant field of the predecessor thread does store a pointer to the lock, then the thread may set the grant field of the predecessor thread to null, as indicated at 542, and enter the critical section as the lock is acquired, as indicated at 540.

Figure 5B:
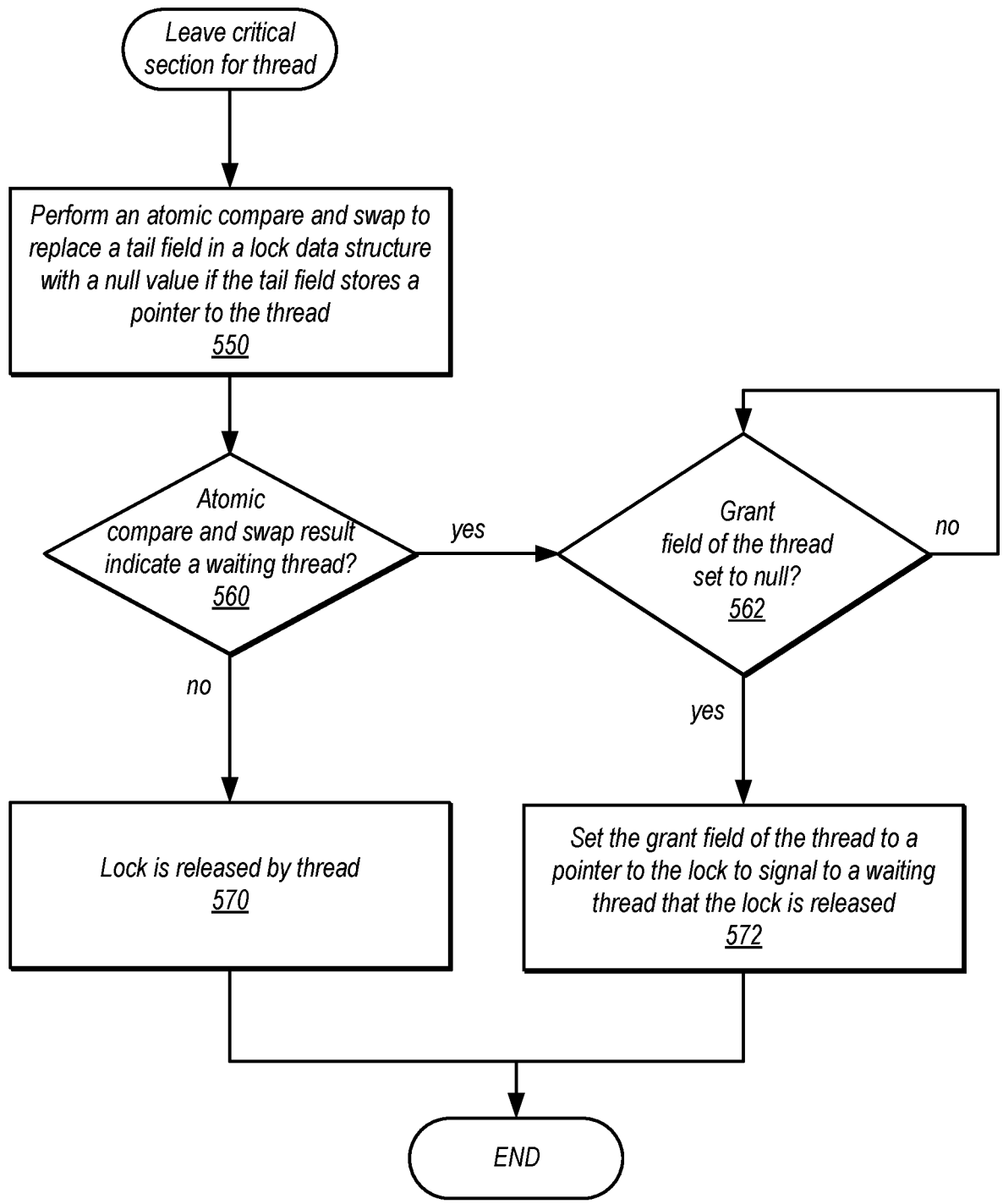

In FIG. 5B, a thread may have completed instructions in the critical section and may be ready to release a lock. The thread may invoke or call an unlock operation to release the lock, in order to allow the lock to be obtained by another thread (e.g., a successor thread waiting for the lock or be available to be obtained by another thread when requested). As indicated at 550, an atomic compare and swap to replace a tail field in a lock data structure with a null value may be performed, in various embodiments. For example, various types of atomic instructions that are "compare and swaps," emulate compare and swaps, or otherwise cause compare and swaps may be performed. The atomic compare and swap operation may complete successfully if the tail field stores a pointer to the thread. As indicated at 560, the atomic compare and swap result may indicate whether a thread is waiting to obtain the lock, in some embodiments. If the compare and swap operation is successful, then no thread is waiting and as indicated by the negative exit from 560, the lock may be considered released by the thread, as indicated at 570.

If the atomic compare and swap result indicates a thread is waiting (e.g., an unsuccessful result), then the thread may wait to complete the unlock operation, as indicated by the negative exit loopback from 562, until the grant field of the thread is set to null. Then, the grant field of the thread may be set to a pointer to the lock to signal to a successor thread waiting for the lock that the lock is released to that successor thread, as indicated at 572. Then, the unlock operation may be complete.

In some embodiments, the spinning on the Grant field may be replaced with a per-thread condition variable and mutex pair that protect the Grant field, allowing threads to use the same waiting policy as the platform mutex and condition variable primitives. All long-term waiting for the Grant field to become a certain address or to return to 0 would be via the condition variables, in some embodiments. Grant field may be treated as a bounded buffer of capacity 1 protected in the usual fashion by a condition variable and mutex, in such embodiments. This construction may yield two interesting properties: (a) the new lock enjoys a fast-path, for uncontended locking, that does not require any underlying mutex or condition variable operations, (b) even if the underlying system mutex is not FIFO, the new lock provides strict FIFO admission. Again, the result may be compact, requiring using only a mutex, condition variable and Grant field per thread, and only one word per lock to hold the Tail. For systems where locks outnumber threads, such an approach would result in space savings.

To allow purely local spinning and enable the use of park-park, the per-thread Grant field can be replaced with a per-thread pointer thread, in some embodiments. The elements on T's chain are T's immediate successors for various locks. Waiting elements contain a next field, a flag and a reference to the lock being waited on and can be allocated on-stack, in some embodiments. Instead of busy waiting on the predecessor's Grant field, waiting threads may use compare and swap to push their element onto the predecessor's chain, and then busy-wait on the flag in their element. The contended unlock (L) operator may detach the thread's own chain, using SWAP of null, traverse the detached chain, and sets the flag in the element that references L. Any residual non-matching elements may be returned to the chain, in such embodiments. The detach-and-scan phase may repeat until a matching successor is found and ownership is transferred.

As discussed above, compact and scalable mutual exclusion techniques as described herein may provide short paths, and avoid the dependent loads and indirection that would be used to locate queue nodes. The contended handover critical path may be extremely short. Despite being compact, compact and scalable mutual exclusion techniques provide local spinning in common circumstances and scales better. Instead of queue elements, a per-thread shared singleton element may be implemented.

The methods described herein may in various embodiments be implemented by any combination of hardware and software. For example, in one embodiment, the methods may be implemented on or across one or more computer systems (e.g., a computer system as in FIG. 6) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 6:
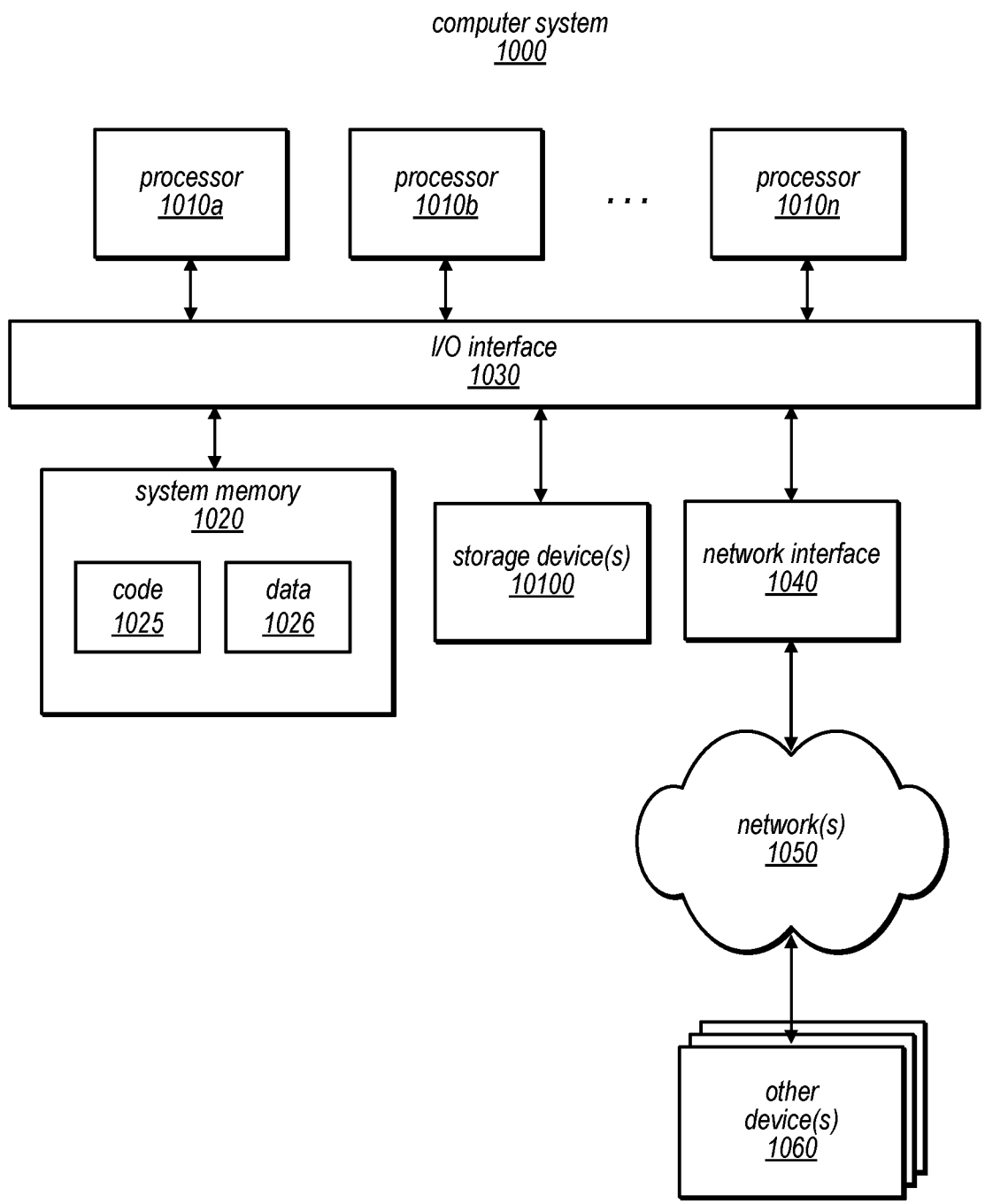
FIG. 6 is a block diagram illustrating one embodiment of a computing system that is configured to implement a thread manager providing a thread cache, as described herein.

FIG. 6 illustrates a computing system configured to implement the methods described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for compact and scalable mutual exclusion on a computing system, as described herein, may be provided as a computer program product, or software, that may include a non-transitory, computer-readable storage medium having stored thereon instructions, which may be used to program a computer system (or other electronic devices) to perform a process according to various embodiments. A non-transitory, computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multi-threaded. Each of the processors 1070 may include a hierarchy of caches, in various embodiments. The computer system 1000 may also include one or more persistent storage devices 1060 (e.g. optical storage, magnetic storage, hard drive, tape drive, solid state memory, etc.) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 10 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement compact and scalable mutual exclusion techniques (which may be one or more of the various implementations discussed above with regard to FIGS. 1-5B) as described herein. Program instructions 1020 may be encoded in platform native binary, any interpreted language such as Java™ byte-code, or in any other language such as C/C++, Java™, etc or in any combination thereof.

In one embodiment, Interconnect 1090 may be configured to coordinate I/O traffic between processors 1070, storage devices 1070, and any peripheral devices in the device, including network interfaces 1050 or other peripheral interfaces, such as input/output devices 1080. In some embodiments, Interconnect 1090 may perform any necessary protocol, timing or other data transformations to convert data signals from one component (e.g., system memory 1010) into a format suitable for use by another component (e.g., processor 1070). In some embodiments, Interconnect 1090 may include support for devices attached through various types of peripheral buses, such as a variant of the Peripheral Component Interconnect (PCI) bus standard or the Universal Serial Bus (USB) standard, for example. In some embodiments, the function of Interconnect 1090 may be split into two or more separate components, such as a north bridge and a south bridge, for example. In addition, in some embodiments some or all of the functionality of Interconnect 1090, such as an interface to system memory 1010, may be incorporated directly into processor 1070.

Network interface 1050 may be configured to allow data to be exchanged between computer system 1000 and other devices attached to a network, such as other computer systems, or between nodes of computer system 1000. In various embodiments, network interface 1050 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1080 may, in some embodiments, include one or more display terminals, keyboards, keypads, touchpads, scanning devices, voice or optical recognition devices, or any other devices suitable for entering or retrieving data by one or more computer system 1000. Multiple input/output devices 1080 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1050.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for acquiring and releasing a lock using compact and scalable mutual exclusion, comprising:
   at least one processor; and
   a memory, storing program instructions that when executed by the at least one processor cause the at least one processor to:
      perform a lock operation, by a first thread, to acquire a lock for executing a critical section of an application, wherein to perform the lock operation, the program instructions cause the at least one processor to:
         swap a pointer to the first thread with a value stored in a tail field of a lock data structure specific to the lock;
         determine whether the value returned from the tail field of the lock data structure is a null value; and
         responsive to determining that the value returned from the tail field of the lock data structure as a result of the swap with the pointer to the first thread is a null value, acquire the lock by the first thread; and
         enter, by the first thread, the critical section of the application;
      responsive to completing the critical section:
         perform, by the first thread, an unlock operation to release the lock by storing a pointer to the lock in the grant field of the first thread to signal to a waiting second thread that the lock is released;
      wait, by the second thread, to acquire the lock until the first thread performs the unlock operation, wherein the second thread detects performance of the unlock operation when the second thread determines that the grant field in a first thread data structure for the first thread stores the pointer to the lock, wherein the first thread data structure is specific to the first thread, and wherein a second thread data structure is specific to the second thread.

2. The system of claim 1, wherein the memory stores further program instructions that when executed by the at least one processor, cause the at least one processor to:
   perform, by the first thread, the unlock operation to release the lock, wherein to perform the unlock operation, the further program instructions cause the at least one processor to:
      perform an atomic compare and swap operation to replace the tail field in the first lock data structure with a null value if the tail field stores a pointer to the first thread;
      responsive to determining, based on a result of the atomic compare and swap operation, that the second thread is waiting on the lock:
         store, in the grant field of the first thread, the pointer to the lock; and
         wait until the grant field of the first thread is set to null before completing an operation to release the lock.

3. The system of claim 1, wherein the memory stores further program instructions that when executed by the at least one processor, cause the at least one processor to set, by the second thread, the grant field of the first thread to null after determining that the grant field in the first thread data structure for the first thread stores the pointer to the lock.

4. The system of claim 1, wherein the memory stores further program instructions that when executed by the at least one processor, cause the at least one processor to:
   before waiting to acquire the lock:
      swap, by the second thread, a pointer to the second thread with a value in the tail field of the lock data structure; and
      determine, by the second thread, that the value swapped with the pointer to the second thread is a pointer to the first thread to cause the second thread to begin the waiting to acquire the lock.

5. The system of claim 1, wherein to acquire the lock after the first thread until the second thread determines that the grant field in the first thread data structure for the first thread stores the pointer to the lock comprises performing an atomic compare and swap to replace the grant field with a null value if the grant field stores the pointer to the lock.

6. The system of claim 1, wherein the memory stores further program instructions that when executed by the at least one processor, cause the at least one processor to:
   perform, by the first thread, the unlock operation to release the lock, wherein to perform the unlock operation, the further program instructions cause the at least one processor to:
      store, in the grant field of the first thread, the pointer to the lock;

perform an atomic compare and swap operation to replace the tail field in the lock data structure with a null value if the tail field stores a pointer to the first thread;
responsive to determining, based on a result of the atomic compare and swap operation, that the second thread is waiting on the lock, wait until the grant field of the first thread is set to null before completing an operation to release the lock.

7. A method for acquiring and releasing a lock using compact and scalable mutual exclusion, comprising:
performing, by one or more computing devices:
acquiring, by a first thread, a lock for executing a critical section of an application, comprising:
performing an atomic instruction that causes a swap of a pointer to the first thread with a value in a tail field of a lock data structure specific to the lock;
determine whether the value returned from the tail field of the lock data structure is a null value; and
responsive to determining that the value returned form the tail field of the lock data structure as a result of the swap with the pointer to the first thread is a null value, acquiring the lock by the first thread; and
entering, by the first thread, the critical section of the application;
responsive to completing the critical section:
performing, by the first thread, an unlock operation to release the lock by storing a pointer to the lock in the grant field of the first thread to signal to a waiting second thread that the lock is released; and
waiting, by the second thread, to acquire the lock until the second thread determines that the grant field in a first thread data structure for the first thread stores the pointer to the lock, wherein the first thread data structure is specific to the first thread, and wherein a second thread data structure is specific to the second thread.

8. The method of claim 7, further comprising:
releasing, by the first thread, the lock, comprising:
performing an atomic instruction that causes a compare and swap to replace the tail field in the lock data structure with a null value if the tail field stores a pointer to the first thread;
responsive to determining, based on a result of the atomic instruction that causes the compare and swap, that the second thread is waiting on the lock: storing, in the grant field of the first thread, the pointer to the lock; and
waiting until the grant field of the first thread is set to null before completing an operation to release the lock.

9. The method of claim 7, further comprising setting, by the second thread, the grant field of the first thread to null after determining that the grant field in the first thread data structure for the first thread stores the pointer to the lock.

10. The method of claim 7, further comprising:
before waiting to acquire the lock:
performing another atomic instruction, by the second thread, that causes a swap of a pointer to the second thread with a value in the tail field of the lock data structure; and
determining, by the second thread, that the value swapped with the pointer to the second thread is a pointer to the first thread to cause the second thread to begin the waiting to acquire the lock.

11. The method of claim 7, wherein to acquire the lock after the first thread until the second thread determines that the grant field in the first thread data structure for the first thread stores the pointer to the lock comprises performing an atomic compare and swap to replace the grant field with a null value if the grant field stores the pointer to the lock.

12. The method of claim 7, further comprising:
releasing, by the first thread, the lock, comprising:
storing, in the grant field of the first thread, the pointer to the lock;
performing an atomic instruction that causes a compare and swap operation to replace the tail field in the lock data structure with a null value if the tail field stores a pointer to the first thread;
responsive to determining, based on a result of the atomic instruction that causes the compare and swap operation, that the second thread is waiting on the lock, waiting until the grant field of the first thread is set to null before completing an operation to release the lock.

13. The method of claim 7, further comprising:
before acquiring the lock for executing a critical section of an application, determining that the grant field in the first thread data structure for the first thread is set to null.

14. One or more non-transitory computer-accessible storage media storing program instructions for acquiring and releasing a lock using compact and scalable mutual exclusion that when executed on or across one or more computing devices cause the one or more computing devices to implement:
performing a lock operation, by a first thread, to acquire a lock for executing a critical section of an application, wherein the program instructions cause the one or more computing devices to implement:
swapping a pointer to the first thread with a value stored in a tail field of a lock data structure specific to the lock; and
determine whether the value returned from the tail field of the lock data structure is a null value; and
responsive to determining that the value returned form the tail field of the lock data structure as a result of the swap with the pointer to the first thread is a null value, acquiring the lock by the first thread; and
entering, by the first thread, the critical section of the application;
responsive to completing the critical section:
performing, by the first thread, an unlock operation to release the lock by storing a pointer to the lock in the grant field of the first thread to signal to a waiting second thread that the lock is released; and
waiting, by the second thread, to acquire the lock until the second thread determines that the grant field in a first thread data structure for the first thread stores the pointer to the lock, wherein the first thread data structure is specific to the first thread, and wherein a second thread data structure is specific to the second thread.

15. The one or more non-transitory computer-accessible storage media of claim 14, storing further instructions that when executed on or across the one or more computing devices cause the one or more computing devices to further implement:
performing an unlock operation, by the first thread, to release the lock, wherein the further instructions cause the one or more computing devices to implement:
performing an atomic compare and swap operation to replace the tail field in the lock data structure with a null value if the tail field stores a pointer to the first thread;
responsive to determining, based on a result of the atomic compare and swap operation, that the second thread is waiting on the lock, storing, in the grant field of the first thread, the pointer to the lock; and
waiting until the grant field of the first thread is set to null before completing an operation to release the lock.

16. The one or more non-transitory computer-accessible storage media of claim 14, storing further instructions that when executed on or across the one or more computing devices cause the one or more computing devices to further implement setting, by the second thread, the grant field of the first thread to null after determining that the grant field in the first thread data structure for the first thread stores the pointer to the lock.

17. The one or more non-transitory computer-accessible storage media of claim 14, storing further instructions that when executed on or across the one or more computing devices cause the one or more computing devices to further implement:
before waiting to acquire the lock:
swapping, by the second thread, a pointer to the second thread with a value in the tail field of the lock data structure; and
determining, by the second thread, that the value swapped with the pointer to the second thread is a pointer to the first thread to cause the second thread to begin the waiting to acquire the lock.

18. The one or more non-transitory computer-accessible storage media of claim 14, storing further instructions that when executed on or across the one or more computing devices cause the one or more computing devices to further implement waiting, by a third thread, to acquire a second lock held by the first thread until the third thread determines that the grant field in the first thread data structure for the first thread stores a pointer to the second lock.

19. The one or more non-transitory computer-accessible storage media of claim 14, wherein the grant field is stored in a first single word and wherein the tail field is stored in a second single word of the lock data structure.

20. The one or more non-transitory computer-accessible storage media of claim 14, storing further instructions that when executed on or across the one or more computing devices cause the one or more computing devices to further implement:
releasing, by the first thread, the lock, comprising:
storing, in the grant field of the first thread, the pointer to the lock;
performing an atomic compare and swap operation to replace the tail field in the lock data structure with a null value if the tail field stores a pointer to the first thread;
responsive to determining, based on a result of the atomic compare and swap operation, that the second thread is waiting on the lock, waiting until the grant field of the first thread is set to null before completing an operation to release the lock.

* * * * *

UNITED STATES PATENT AND TRADEMARK OFFICE
CERTIFICATE OF CORRECTION

| | | |
|---|---|---|
| PATENT NO. | : 12,124,876 B2 | Page 1 of 1 |
| APPLICATION NO. | : 17/169246 | |
| DATED | : October 22, 2024 | |
| INVENTOR(S) | : Dice et al. | |

It is certified that error appears in the above-identified patent and that said Letters Patent is hereby corrected as shown below:

In the Specification

In Column 1, Line 56, delete "FIG." and insert -- FIGS. --, therefor.

In Column 1, Line 59, delete "FIG." and insert -- FIGS. --, therefor.

In the Claims

In Column 17, Line 21, in Claim 7, delete "form" and insert -- from --, therefor.

In Column 18, Line 37, in Claim 14, delete "form" and insert -- from --, therefor.

Signed and Sealed this
Eleventh Day of February, 2025

Coke Morgan Stewart
*Acting Director of the United States Patent and Trademark Office*